Patented Feb. 29, 1944

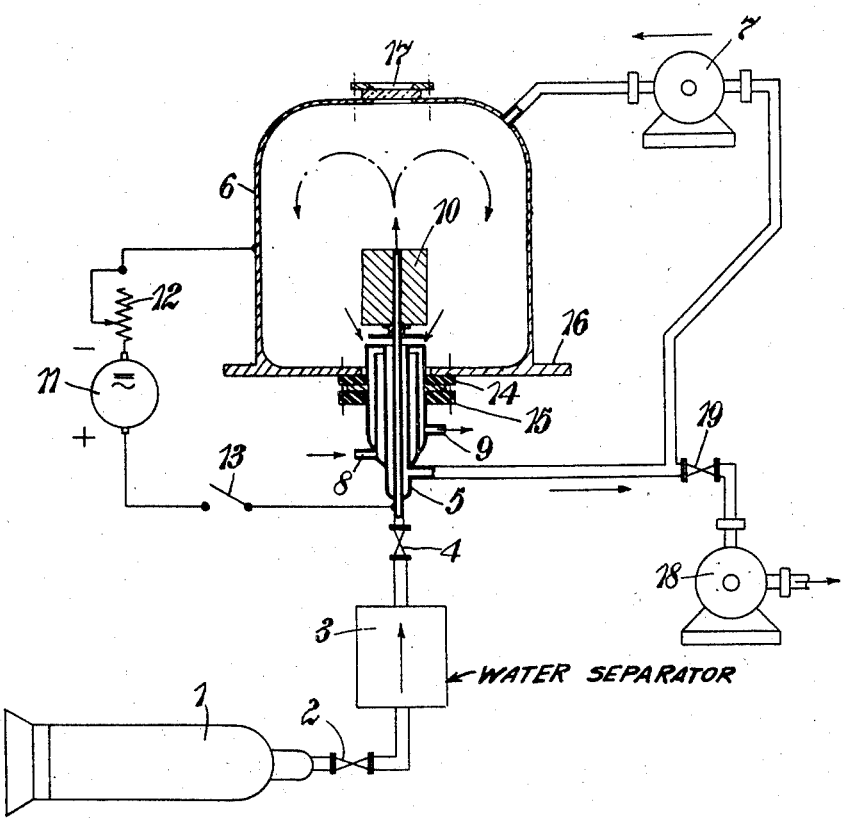

2,342,784

UNITED STATES PATENT OFFICE 2,342,784

PURIFICATION OF GASES

Bernhard Berghaus, Berlin-Lankwitz, and Wilhelm Burkhardt, Berlin-Grunewald, Germany; vested in the Alien Property Custodian Application July 7, 1939, Serial No. 283,312
In Germany July 15, 1938

3 Claims. (Cl. 204—164)

The invention relates to apparatus for the purification of gases, more particularly noble gases, by the removal of undesirable admixtures, such as for instance oxygen, nitrogen, hydrogen or hydrocarbons.

In carrying the invention into practice an easily vaporisable metal, such as zinc, magnesium, lithium, calcium, beryllium, lead and like materials in the form of a solid body mounted in an electrically insulated manner, connected as an anode, or permanently or temporarily as a cathode, is heated by the heating action of a gas or glow discharge in a gas discharge chamber, the wall of which may permanently or temporarily constitute the cathode to such a temperature, that a metal vapour partial pressure of at least $10^{-4}$ and preferably $10^{-2}$ to 1 millimeters of mercury is produced. The metal body to be vaporised is preferably mounted in the middle of the gas discharge chamber.

The speed of vaporisation of the metal may be regulated by the vacuum which is produced, or by the electric power which is applied.

The metal to be vaporised preferably consists of magnesium or a magnesium alloy, such as Elektron. The gas purification may be carried out at a vacuum of 30 to 0.001 and preferably 3 to 0.1 millimeters of mercury. The gas discharge housing may also be made of magnesium or a magnesium alloy and is preferably cooled. The gas supply and discharge is preferably effected by an insulated, screened and cooled current lead-in assembly. The purification of the gas by the vaporised metal is effected at voltages between 150 and 5,000 volts. The discharge current or the discharge power is dependent upon the dimensions of the apparatus to be operated and the amount of gas passing through.

It has been found that a purification of noble gases may be quickly effected, if, for instance, magnesium is vaporised in the purification chamber. The impurities which easily react chemically with the magnesium which is present in its vapour form are deposited on the cooled wall of the discharge chamber. Even at a temperature of 340° C. and a pressure of 0.1 millimeter of mercury of the filling gas the magnesium develops an amount of vapor of one milligram for each square centimeter of the surface of the body to be vaporized for each hour of operation. At least 0.36 cubic centimeter of oxygen at a pressure of 760 millimeters of mercury may be combined with such an amount of vaporized magnesium.

The amount of gas to be passed through the apparatus depends on the amount of the magnesium vapour which is developed. For instance, at a temperature of 500° C., 4 grams of magnesium would be converted into vapour for each square centimeter of surface of the magnesium body an hour. With this amount of vaporized magnesium there can be combined an amount of oxygen of 1.5 litres at 760 millimeters of mercury or the corresponding equivalent of nitrogen. It will be seen that with a magnesium body having a suitably large surface economical purification of noble gases can be obtained. The extremely quick purification action by the metal vapour is apparently due to the ionisation of the metal vapour in the gas discharge chamber. The purification, which may be ascertained by the reduction in pressure, takes place almost instantaneously, always when the spectrum of the metal vapour became visible.

The installation is suitable for the production of spectrum pure argon from technical argon.

The various objects and features of the invention will be apparent from a consideration of the accompanying drawing and the following description wherein an exemplary embodiment of apparatus for carrying the invention into practice is disclosed.

The single figure of the drawing is a sectional view of a glow discharge housing illustrating means for purifying gases therein.

Referring to the drawing, the gas which may for instance have to be freed of oxygen and nitrogen is contained in the bottle 1 and passes through a valve 2 into the water separator 3 from which it goes past the regulating valve 4 and the hollow and coolable lead-in conductor 5 into the gas discharge chamber 6, in which the gas is freed of oxygen, nitrogen or like undesirable constituents by vaporised magnesium or magnesium alloys, such as Elektron. By means of a pump 7 the purified gas can be circulated through the purifying apparatus. The purified gas is supplied to a storage container or consuming apparatus through the valve 19 and the vacuum pump 18. The vacuum pump 18 enables a pressure of about 30 to 0.001 and preferably 3 to 0.1 millimeters of mercury to be obtained in the purifying chamber.

A cooling medium may be supplied through the pipe connection 8 to the current lead-in 5 and be discharged through the pipe connection 9. The wall of the gas discharge chamber 6 and the electrode 10 consist of magnesium or magnesium alloys, such as Elektron. The source of continuous or alternating current voltage 11 having preferably a voltage of 200 to 1,000 volts is connected over an adjustable resistance 12 to the housing of the gas discharge chamber and over a switch 13 to the current lead-in 5 and the metal 10 to be vaporised. 14 is an insulating ring and 15 an insulating and clamping ring which is clamped on by means of screws not shown. 16 is the bottom plate and 17 an inspection window. The operation of the purifying device is such that the magnesium, preferably vaporised at pressures of 3 to 0.1 millimeters of mercury, binds the oxygen and similar impurities.

The wall of the purifying apparatus may be cooled. It is, however, an advantage to heat it by the gas discharge, to such a temperature that the magnesium which is vaporised thereon is vaporised again. At temperatures of over 300° C. the time for the purification of, for instance argon, having the same admixtures, is substantially shorter as compared with the cooled electrodes. Over 400° C. there occurs a very intensive vaporisation of the magnesium, so that not only are the impurities quickly removed but a spectrum pure argon is also bound by the magnesium vapour which is condensing.

What we claim is:

1. Apparatus for the purification of noble gases comprising, a sealed metal housing, means for evacuating said housing to provide a pressure therein for supporting a glow discharge within the housing, means for supporting a solid body of readily vaporizable metal within the housing, means for insulating and sealing said supporting means with respect to said housing, a source of direct current, means for connecting the negative terminal of said source to said housing, means for connecting the positive terminal of said source to said body whereby a glow discharge is established within the housing to vaporize said metal body, means for introducing a noble gas into the presence of said vaporized metal within the housing, means for circulating the gas through said housing, and means for removing gas from said circulating means.

2. Apparatus for the purification of noble gases comprising, a sealed housing, means for evacuating said housing to provide a pressure therein for supporting a glow discharge within the housing, a solid magnesium body, means for supporting said magnesium body within said housing, means for insulating and sealing said supporting means with respect to said housing, an electrical source, means for impressing the voltage of said source across said housing and said magnesium body to provide a glow discharge within the housing for vaporizing said magnesium body, means for introducing a noble gas into the housing and in the presence of said magnesium body whereby oxygen and nitrogen in the gas combine with the vaporized magnesium, means for circulating the gas through said housing, and means for removing the gas free of oxygen and nitrogen from the housing.

3. The method of purifying noble gases which comprises, arranging a solid body of a readily vaporizable metal within a sealed housing, adjusting the pressure within the housing between 30 and 0.001 millimeters of mercury, impressing a voltage across the housing and the metal body to provide a glow discharge within the housing to heat and vaporize said metal body, injecting a noble gas into the presence of the vaporized metal within the housing whereby impurities in the gas combine with the vaporized metal, circulating said gas through the housing, removing the purified gas from the housing, and adjusting the voltage impressed across the housing and said body for controlling the rate of vaporization of the metal body.

BERNHARD BERGHAUS.
WILHELM BURKHARDT.